E. STAGE.
REINFORCING NUT BAR CRANK SHAFT CASING.
APPLICATION FILED MAR. 1, 1915.
1,146,533.
Patented July 13, 1915.
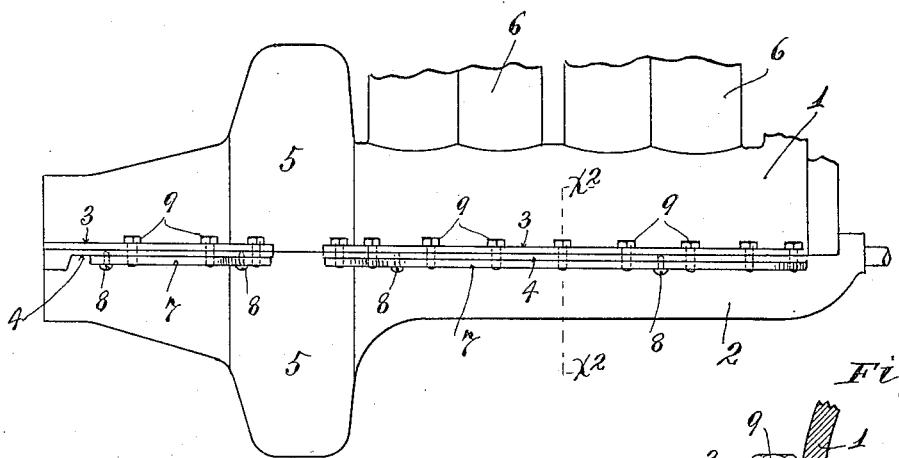
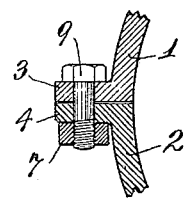
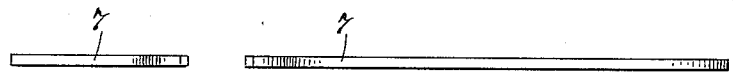
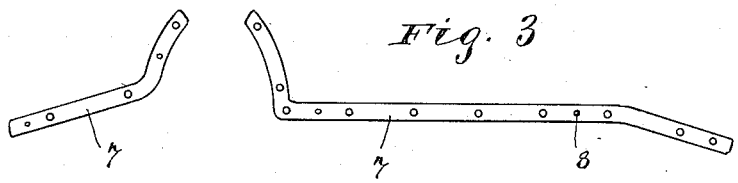
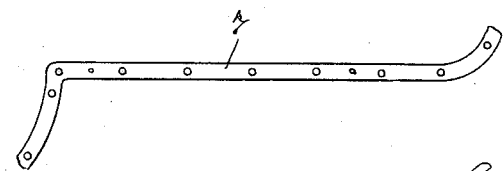

UNITED STATES PATENT OFFICE.

ERWIN STAGE, OF WAUBAY, SOUTH DAKOTA.

REINFORCING-NUT-BAR CRANK-SHAFT CASING.

1,146,533. Specification of Letters Patent. Patented July 13, 1915.

Application filed March 1, 1915. Serial No. 11,393.

*To all whom it may concern:*

Be it known that I, ERWIN STAGE, a citizen of the United States, residing at Waubay, in the county of Day and State of South Dakota, have invented certain new and useful Improvements in Reinforcing-Nut-Bar Crank-Shaft Casings; and I do hereby declare the following to be a full, clear, and exact description of the invention, such as will enable others skilled in the art to which it appertains to make and use the same.

My invention relates to explosive engines, and has for its object to provide a simple and highly efficient so-called nut bar which not only takes the place of a plurality of nuts, but very greatly reinforces and stiffens the crank shaft casing at the flanges of its separable sections. In the accompanying drawings, the said reinforcing nut bars are shown as applied to a crank shaft casing of the engine of the well known Ford automobile, but it will, of course, be understood that by slight changes in outline, the invention may be applied to various other types of explosive engines or motors.

In the drawings, like characters indicate like parts throughout the several views.

Referring to the drawings: Figure 1 is a side elevation showing the crank shaft casing of an engine of the type above indicated and illustrating my invention applied thereto; Fig. 2 is a section taken on the line $x^2$ $x^2$ on Fig. 1; Fig. 3 is a plan view showing several sections of the so-called reinforcing nut bar; and Fig. 4 is a side elevation of the parts shown in Fig. 3.

The numerals 1 and 2 indicate, respectively, upper and lower sections of the crank shaft casing, the same being divided on a horizontal line and having at their parting edges, outstanding flanges 3 and 4, respectively, which are usually connected by a multiplicity of nut-equipped bolts passed through perforations in the said flanges. The sections 2 and 3 are expanded at 5 to afford a casing for the fly wheel of the engine, and the upper section 1 is cast integral with the cylinders 6. When the multiplicity of nut-equipped bolts are applied to the flanges 3 and 4, to detachably connect the case sections 1 and 2, considerable time is required and considerable difficulty experienced in applying the numerous nuts to the coöperating bolts; and furthermore, the numerous bolt holes materially weaken the said flanges. Also, loose nuts are frequently lost.

In accordance with my invention, I employ the so-called reinforcing nut bars 7 which are preferably of steel or iron, and these are bent to conform to the contour of the said flanges 3 and 4. Preferably, they are detachably but rigidly secured to the lower surfaces of the lower flanges 4 independently of the case connecting bolts, by rivets or by machine screws 8, so that they are always in proper position, in respect to the said flanges 4. The inner ends thereof are bent so that they extend at least part way around the expanded case section 5. Extension of the said bars completely around the expanded portion 5 is not necessary because that portion of the said casing is the strongest part of the entire casing.

At numerous and proper points, machine screws 9 are passed loosely through perforations in the flanges 3 and 4 and are screwed into threaded seats in the underlying nut bars 7. With this arrangement, the case sections may be readily separated, simply by unscrewing the screws or bolts 9, and when the said case sections are to be again connected, after they have been properly assembled, it is an easy matter to re-apply the connecting screws 9, for the reason that the said nut bars, being relatively fixed, in respect to the flanges 4, always have their threaded screw-receiving seats in proper position to receive the threaded lower ends of the said screws. It is also clearly evident that the said nut bars very greatly stiffen and strengthen the perforated flanges 3 and 4 of the casing, and hence, reinforce the entire casing.

What I claim is:

1. The combination with the sections of a divided engine casing, the said sections having projecting flanges, of reinforcing nut bars following the contour of said flanges and applied to one thereof, and machine screws passed through perforations in the said flanges and screwed into the said nut bars.

2. The combination with the sections of a divided engine casing, the said sections having projecting flanges, of reinforcing nut bars following the contour of said flanges and applied to one thereof, machine screws passed through perforations in the said flanges and screwed into the said nut bars, and means independent of said screws holding said nut bars to one of the said flanges, and hence, properly positioned in respect thereto.

3. The combination with a sectional crank shaft casing having an expanded intermediate portion for inclosing a fly wheel, the sections of said casing having outstanding flanges at their parting edges, of reinforcing nut bars applied to the flange of one of said case sections and following the contour thereof, and following part way around the contour of the said expanded portion of said casing but separated at their adjacent ends, and machine screws passed through perforations in the said flanges and directly screwed into said nut bars.

4. The combination with a sectional crank shaft casing having an expanded intermediate portion for inclosing a fly wheel, the sections of said casing having outstanding flanges at their parting edges, of reinforcing nut bars applied to the flange of one of said case sections and following the contour thereof, and following part way around the contour of the said expanded portion of said casing but separated at their adjacent ends, machine screws passed through perforations in the said flanges and directly screwed into said nut bars, and means independent of said screws independently securing the several nut bars to the flange to which they are applied.

In testimony whereof I affix my signature in presence of two witnesses.

ERWIN STAGE.

Witnesses:
H. H. FROMELS,
GUY F. HERINGTON.